United States Patent [19]

Buchsel

[11] Patent Number: 4,611,654

[45] Date of Patent: Sep. 16, 1986

[54] PASSIVE SYSTEM FOR HEAT TRANSFER

[76] Inventor: Christian K. E. Buchsel, 18503 SE. 64th Way, Issaquah, Wash. 98027

[21] Appl. No.: 693,805

[22] Filed: Jan. 23, 1985

[51] Int. Cl.[4] .............................................. F28D 15/00
[52] U.S. Cl. .......................... 165/104.22; 165/104.29; 417/209; 417/208; 237/64; 126/433
[58] Field of Search ...................... 165/104.22, 104.24, 165/104.28, 104.29; 417/208, 209; 237/60, 61, 62, 64; 126/433

[56] References Cited

U.S. PATENT DOCUMENTS

| | | | |
|---|---|---|---|
| 1,148,857 | 8/1915 | Reck | 237/62 |
| 2,226,797 | 12/1940 | Andersson | 62/333 |
| 2,230,917 | 2/1941 | Triana . | |
| 4,061,131 | 12/1977 | Bohanon . | |
| 4,110,986 | 9/1978 | Tacchi . | |
| 4,224,925 | 9/1980 | Movick . | |
| 4,241,784 | 12/1980 | Tacchi . | |
| 4,246,890 | 1/1981 | Kraus et al. . | |
| 4,270,521 | 7/1981 | Brekke . | |
| 4,467,862 | 8/1984 | DeBeni . | |

FOREIGN PATENT DOCUMENTS

| | | | |
|---|---|---|---|
| 439616 | 4/1912 | France | 237/64 |
| 447520 | 10/1912 | France | 237/64 |

Primary Examiner—Albert W. Davis, Jr.

Attorney, Agent, or Firm—Christensen, O'Connor, Johnson & Kindness

[57] ABSTRACT

A passive heat transfer system is provided wherein the vapor generated by the boiling of a working fluid is harnessed to transport the working fluid from a heat source to a heat sink below the heat source. A passive circulation unit is installed in a heat transfer system between the outlet port of a heat collector and a collector drain duct that leads to a heat sink that is positioned below the heat collector. In preferred embodiments, a collector feed duct permits fluid to return to the heat collector from the heat sink and a check valve prevents flow in the opposite direction. The passive circulation unit includes an upper chamber and a lower chamber disposed in vertical array, with the lower end of the lower chamber being positioned above the heat collector outlet port. In the simplest embodiment the two chambers are connected by a vent duct that leads from the bottom region of the lower chamber to the top region of the upper chamber. The collector drain duct connects to an opening in the lower end of the upper chamber. In a second disclosed embodiment, the passive circulation unit is fitted with a valve that intermittently interrupts the flow of working vapor through the lower chamber and thereby causes working fluid to be displaced into the vent duct and expelled therefrom into the upper chamber in a cyclical manner.

11 Claims, 7 Drawing Figures

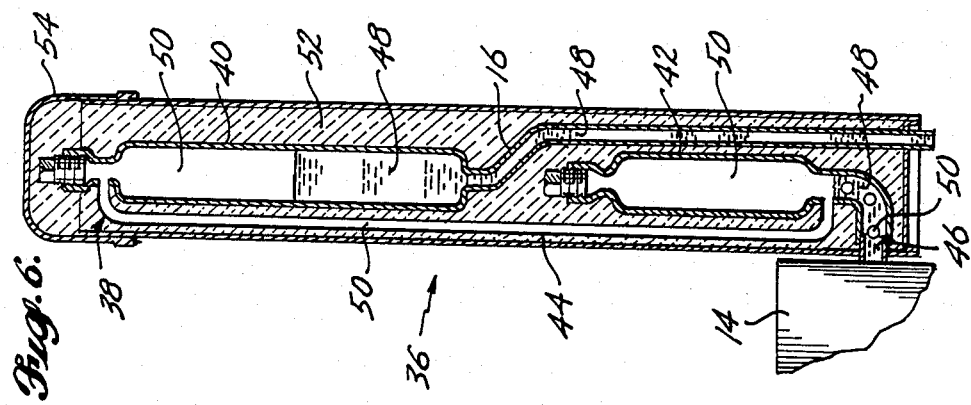
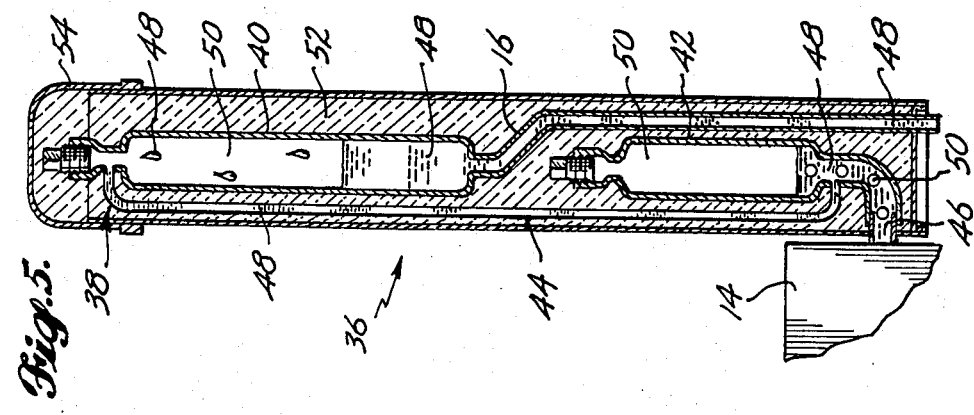
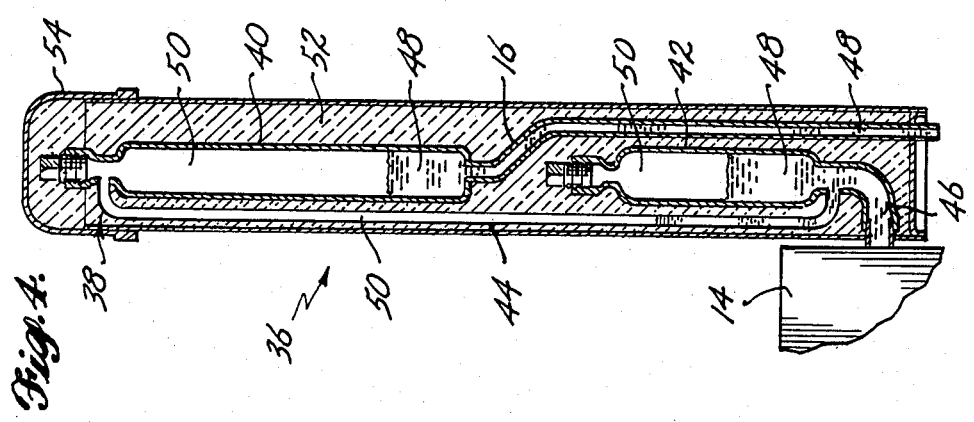

PASSIVE SYSTEM FOR HEAT TRANSFER

TECHNICAL FIELD

The present invention relates to heat transfer systems and more particularly to heat transfer systems in which a working fluid is passively circulated from a heat source to a heat sink that is positioned below the heat source.

BACKGROUND OF THE INVENTION

Fluid-charged heating systems are well known and in widespread use. Such systems typically circulate a working fluid to which and from which heat is transferred through a closed system of ducts from a heat source to a heat sink and back to the heat source. During this circulation, the working fluid goes through a working cycle that involves the transfer of heat to and from the working fluid. For example, water can be heated by a heat source such as an oil-fired boiler in the basement of a building, and the heated water can then be circulated in a closed loop to radiators in other parts of the building. In systems of this type passive thermal circulation can be utilized to circulate the working fluid. The heated water and steam rises from the basement boiler to radiators in the upper stories of the building where the heat can be extracted into the living quarters (heat sink). Then the relatively high-density, cooled water flows by gravity back to the basement heat source for reheating. Such a system is called a passive heat transfer system because no pumps or external power source (other than the energy used to heat the working fluid at the heat source) is required to circulate the working fluid from the heat source to the heat sink and back to the heat source.

Passive, closed, fluid-charged solar collector systems similar to the above-mentioned oil-fired burner system have been devised. In such a system, a storage tank (heat sink) is mounted above the solar collector. Working fluid that is heated within the solar collector rises from the heat collector into the storage tank. Heat can be removed from the heated working fluid in the storage tank as needed, either through a heat exchanger or by directly replacing heated fluid with cold fluid. Working fluid from which the heat has been spent is thermally circulated by gravity flow back to the solar collector. Although such passive solar collector systems have the advantage of being mechanically simple, practical limitations on storage tank size because of structural strength requirements and aesthetic considerations severely limit their use. Therefore it is often necessary or desirable to locate the heat sink below the heat collector.

Active systems that include additional mechanical apparatus such as pumps have been used to transfer heated working fluid from a rooftop solar collector or other heat source to the lower stories of a building where the heat can be used or stored. For example, FIG. 1 shows the major components of a conventional heat transfer system 10 that actively circulates working fluid to a heat sink 12 that is located below a heat collector 14. The heat collector 14, which in this case is a rooftop solar collector, is in fluid communication through a collector drain duct 16 with the heat sink 12. The heat sink 12 is in fluid communication through a collector feed duct 18 with the heat collector 14. A check valve 20 is positioned in the collector feed duct 18 to prevent back flow from the heat collector 14 through the collector feed duct 18 to the heat sink 12. The check valve 20 prevents the thermal circulation (indicated by arrows 21) from reversing, which would passively remove heat from storage, when there is no solar energy input to the heat collector 14. An expansion tank 22 and an electrical pump 24 are also provided in the collector feed duct 18. The expansion tank 12 accommodates the volume change caused by thermal expansion of the working fluid. Temperature probes 26, 28 are provided in the heat collector 14 and in the heat sink 12. Wiring 30 connects the temperature probes 26, 28 to a control box 32 and electrically couples the pump 24 through the control box 32 with a power source 34. Whenever there is a temperature difference of sufficient magnitude between the working fluid contained in the heat collector 14 and the heat sink 12, the control box 32 activates the pump 24, and the working fluid is pumped through the system 10 at a constant rate.

Compared to conventional passive systems, conventional active systems characteristically exhibit a higher degree of complexity because of their dependence upon components such as pumps and temperature control elements and upon an external power source. Mechanical complexity, presence of moving parts, use of electric and electronic components all contribute adversely to system cost, reliability, and operating life. Dependence upon external power limits the use of active systems in underdeveloped regions. However, active systems do accomplish what conventional passive systems cannot do: the transfer of heat from a heat source to a heat sink that is positioned below the heat source.

In attempts to overcome at least some of the disadvantages of active systems, several passive heat transfer systems have been proposed wherein the pressure and/or volume generated by vaporizing a working fluid moves the working fluid through a heating system from a heat collector to a lower heat sink and back without external pumps, controls, or nonthermal energy input. For example, see U.S. Pat. Nos. 4,224,925; 4,241,784; 4,246,890; 4,270,521; and 4,467,862. Although useful in some situations, these passive systems present distinct disadvantages and drawbacks, being mechanically complex and subject to failure due to mineral deposition or corrosion.

SUMMARY OF THE INVENTION

The present invention provides a passive heat transfer system wherein the vapor generated by the boiling of a working fluid is harnessed to transport the working fluid from a heat source to a heat sink below the heat source. In accordance with this invention, a passive circulation unit is installed in a heat transfer system between the outlet port of a heat collector and a collector drain duct that leads to a heat sink that is positioned below the heat collector. In preferred embodiments, a collector feed duct permits fluid to return to the heat collector from the heat sink and a check valve prevents flow in the opposite direction (i.e., from the heat sink to the outlet port of the heat collector). The passive circulation unit includes an upper chamber and a lower chamber disposed in vertical array, with the lower end of the lower chamber being positioned above the heat collector outlet port. In the simplest embodiment the two chambers are connected by a vent duct that leads from the bottom region of the lower chamber to the top region of the upper chamber. The collector drain duct connects to an opening in the lower end of the upper chamber. In operation the system is nearly completely filled with a volatile working fluid and is preferably partially evacuated of air, so that spaces above the working fluid in the chambers and vent duct are occupied by saturated working vapor and residual air. When the working fluid in the heat collector (e.g., a solar collector or coils located in a fireplace) reaches the boiling pont, the vapor that is generated enters the lower chamber. As the working vapor accumulates in the upper region of the lower chamber, working fluid is forced from the lower chamber, through the vent duct, into the upper chamber. As the boiling continues, the working fluid in the lower chamber is eventually exhausted and the vent duct blows free of working fluid. At this point in the working cycle, the pressure head of the column of working fluid upstream of the check valve causes the check valve to open, and working fluid circulates through the system, with heated fluid flowing from the heat collector to the heat sink and cooler fluid flowing from the heat sink into the heat collector. The influx of cooler working fluid into the heat collector arrests the boiling process and causes the system to return to its initial phase, with the upper and lower chambers of the passive circulation unit partially filled with working fluid and partially filled with working vapor and residual air. The working cycle then continues in a pulsating fashion.

In a second disclosed embodiment, the passive circulation unit is fitted with a valve that intermittently interrupts the flow of working vapor through the lower chamber and thereby causes working fluid to be displaced into the vent duct and expelled therefrom into the upper chamber in a cyclical manner.

BRIEF DESCRIPTION OF THE DRAWINGS

FIG. 4 is a cross section through a passive circulation unit showing the relative positions of the working fluid and working vapor at the initial phase of a working cycle;

FIG. 5 is a view similar to FIG. 4 but showing the relative positions of the working fluid and working vapor at a point midway through the potential energy accumulation phase of a working cycle;

FIG. 6 is a view similar to FIGS. 4 and 5, showing the relative levels of the working fluid and working vapor at the end of the potential energy accumulation phase of a working cycle, just as the vent duct has blown free of working fluid; and, FIG. 7 is a schematic view of another embodiment of the present invention in which an eccentrically supported flip valve is disposed across the lower chamber of a passive circulation unit.

DESCRIPTION OF PREFERRED EMBODIMENTS

Figure 2:
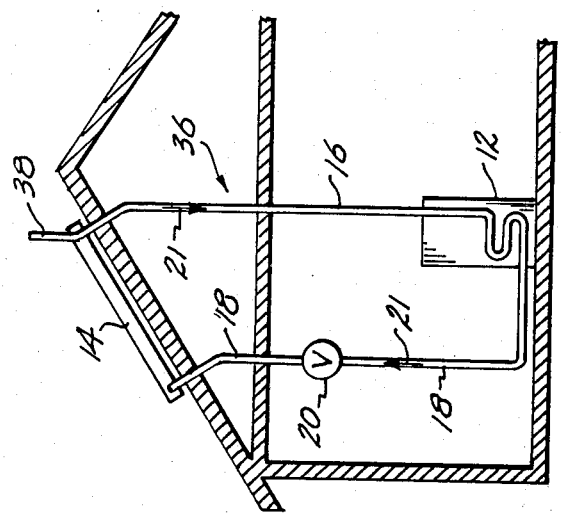
FIG. 2 is a schematic view similar to FIG. 1 but of the much simpler passive heat transfer system of the present invention.
Figure 1:
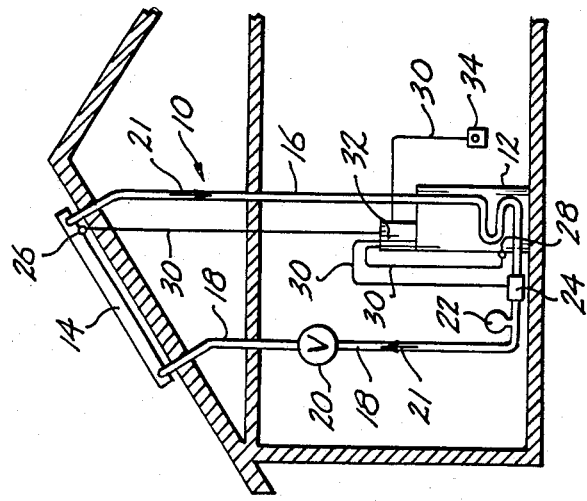
FIG. 1 is a schematic view of an active heat transfer system of the prior art which employs a rooftop solar heat collector and a heat sink at a lower level of the building in which the solar heating system is utilized.

Referring now to FIG. 2, the major components of a passive heat circulation system 36 of the present invention include a heat source such as a rooftop solar collector 14 and a heat sink 12 that is located below the heat collector 14. The heat collector 14 is in fluid communication through a collector drain duct 16 with the heat sink 12. The heat sink 12 is in fluid communication through a collector feed duct 18 with the heat collector 14. A check valve 20 is positioned in the system, preferably in the collector feed duct 18, to prevent back flow from the heat collector 14 through the collector feed duct 18 to the heat sink 12. The check valve 20 can alternatively be positioned in the collector drain duct 16, heat sink 12, of heat collector 14 in order to maintain the thermal circulation as indicated by arrows 21. In accordance with the present invention, a passive circulation unit 38 is provided in the aforementioned circulation loop above the heat collector 14. The passive circulation unit 38, as described in detail below, is a compact assembly that need contain only two chambers and one interconnecting duct. The passive circulation unit 38 can have no moving parts at all, and yet it functionally replaces the pump 24, control box 32, temperature probes 26, 28, wiring 30, expansion tank 22, and electrical power source 34 that are required to circulate and regulate the flow of working fluid in conventional active heat transfer systems such as that shown in FIG. 1.

Figure 3:
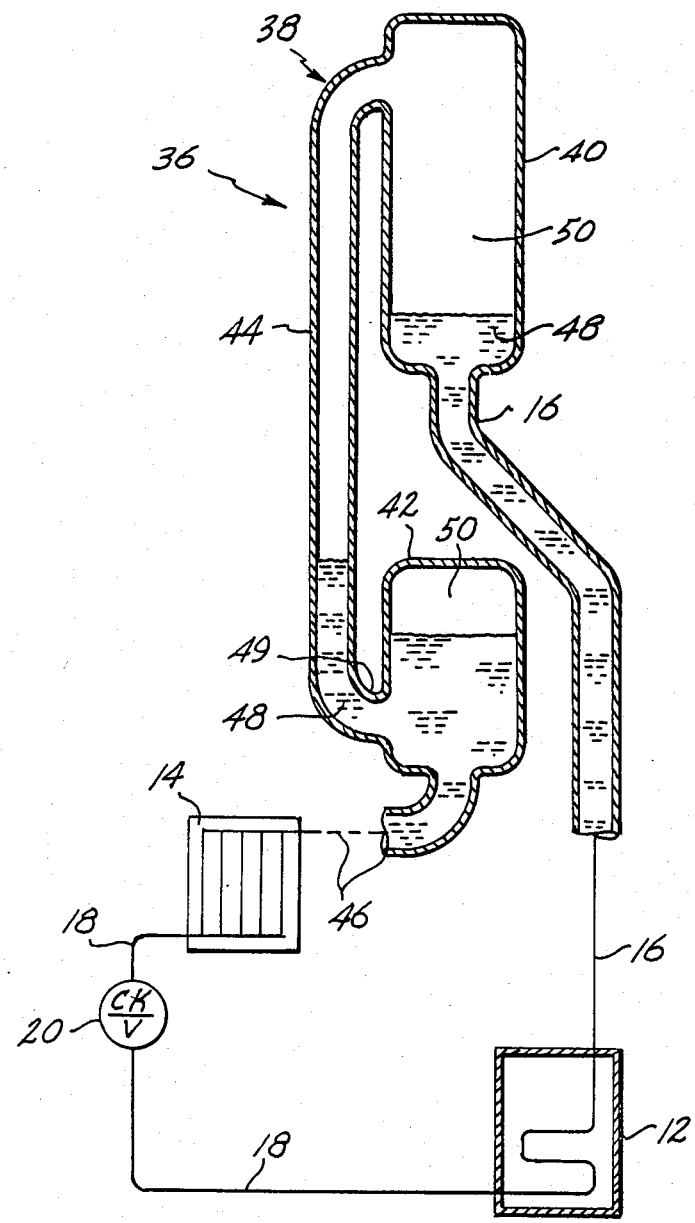
FIG. 3 is a schematic view of one embodiment of the passive heat transfer system of the present invention showing a passive circulation unit with two chambers, one interconnecting duct, and no moving parts.

Referring now to FIG. 3, the passive circulation unit 38 in its simplest embodiment consists of two chambers 40, 42 and an interconnecting duct 44 that are in fluid communication with the other components of the system 36, which includes a heat collector 14 that can be a solar collector, a fireplace heat collector, or a conventional heat exchanger. The upper chamber 40 and the lower chamber 42 are disposed in vertical array, with the lower end of the lower chamber 42 disposed above and in fluid communication with an outlet port 46 on top of the heat collector 14. The two chambers 40, 42 are in fluid communication through a vent duct 44 that leads from the lower region of the lower chamber 42 to the upper region of the upper chamber 40. The lower region of the upper chamber 40 is in fluid communication through the collector drain duct 16 with the heat sink 12. The heat circulation system 36 is nearly completely filled with working fluid 48 so that the passive circulation unit 38 is partially filled with working fluid 48. In order for this system to be operable, the initial phase levels of working fluid 48 in the various components of the passive circulation unit 38 must be as follows: the lower chamber 42 must be filled so as to at least submerge the opening 49 to the vent duct 44, and, that condition being fulfilled, there must be sufficient volume unoccupied by working fluid 48 in the upper chamber 40 to accept all of the working fluid 48 that will be pushed out of the lower chamber 42 and vent line 44 during the potential energy accumulation phase of the working cycle, as described below. In operation, this can be conveniently achieved by incorporating a bleed valve (not shown) into the system 36 and empirically adjusting the volume of working fluid 48 until the working cycle pulses, as described below. Preferably the system 36 is nearly completely evacuated of air, so that the spaces above the working fluid 48 in the upper and lower chambers 40, 42 and the vent duct 44 are occupied by saturated working vapor 50. The passive circulation unit 38 will also operate if the upper chamber 40 is vented to the external environment, but some loss of volatile working fluid 48 from the system 36 would thereby result. The walls of the two chambers 40, 42 and the vent duct 44 can be made of copper, steel, or other materials that can withstand the pressures that are generated during the working cycle.

Referring now to FIGS. 4, 5 and 6, the working cycle proceeds in a discontinuous, pulsating fashion. The working cycle involves an initial phase, a potential energy accumulation phase, and a circulation phase. Boiling of the working fluid 48 is the heat collector 14 is associated with an expansion of volume. The volume expansion of the working vapor 50 is harnessed in the passive circulation unit 38 to elevate batches of heated working fluid 48 (potential energy accumulation phase) and then to circulate the elevated working fluid 48 through the system 36 (circulation phase).

FIG. 4 shows the system 36 at rest: there is no boiling anywhere in the circulation loop at this initial phase of the working cycle. The chambers 40, 42 and vent duct 44 are partially filled with working fluid 48, and the spaces above the working fluid 48 are occupied by saturated working vapor 50 and residual air. The passive circulation unit 38 is preferably surrounded by thermal insulating material 52, so that heat loss to the environment is minimized, and the insulated unit 38 is covered by a protective housing 54.

Referring now to FIG. 5, as the working fluid 48 in the heat collector 14 accumulates heat, the working fluid 48 starts to boil. The working vapor 50 that is generated in the heat collector 14 bubbles through the outlet port 46 at the top of the collector 14 and into the lower chamber 42 of the passive circulation unit 38. In this embodiment, the generated working vapor 50 is trapped in the upper dead end of the lower chamber 42. As boiling continues, the working vapor 50 that accumulates in the lower chamber 42 displaces working fluid 48 from the lower region of the lower chamber 42, through the vent duct 44, and into the upper chamber 40. The displaced working fluid 48 that enters the upper chamber 40 increases the potential energy of the fluid column on the upstream side of the check valve 20 (see FIG. 3). However, as long as there is working fluid 48 in the vent duct 44 the static pressure downstream from the check valve 20 is higher than on the upstream side, and so the check valve 20 remains closed.

Referring now to FIG. 6, as boiling continues, all of the working fluid 48 in the lower chamber 42 is forced into the vent duct 44, and then the vent duct 44 blows free of working fluid 48. At this point the system has accumulated the maximum potential energy, and so this is the preferred threshold between the potential energy accumulation phase and the circulation phase of the working cycle. The potential energy of the fluid column upstream from the check valve 20 is now significantly taller than on the downstream side, and the associated pressure differential causes the check valve 20 to open and working fluid 48 to circulate through the system 36. As cooler working fluid 48 advances through the collector feed duct 18 into the heat collector 14, the boiling process in the heat collector 14 is temporarily arrested. The difference in pressure across the check valve 20 disappears as fluid levels reach equilibrium, and the check valve 20 closes. The circulation of working fluid 48 through the system 36 stops, and fluid levels in the passive circulation unit 38 return to those of the initial phase shown in FIG. 4. The lower chamber 42 does not completely fill with working fluid 48 due to the presence of some residual working vapor 50 and residual air.

Figure 7:
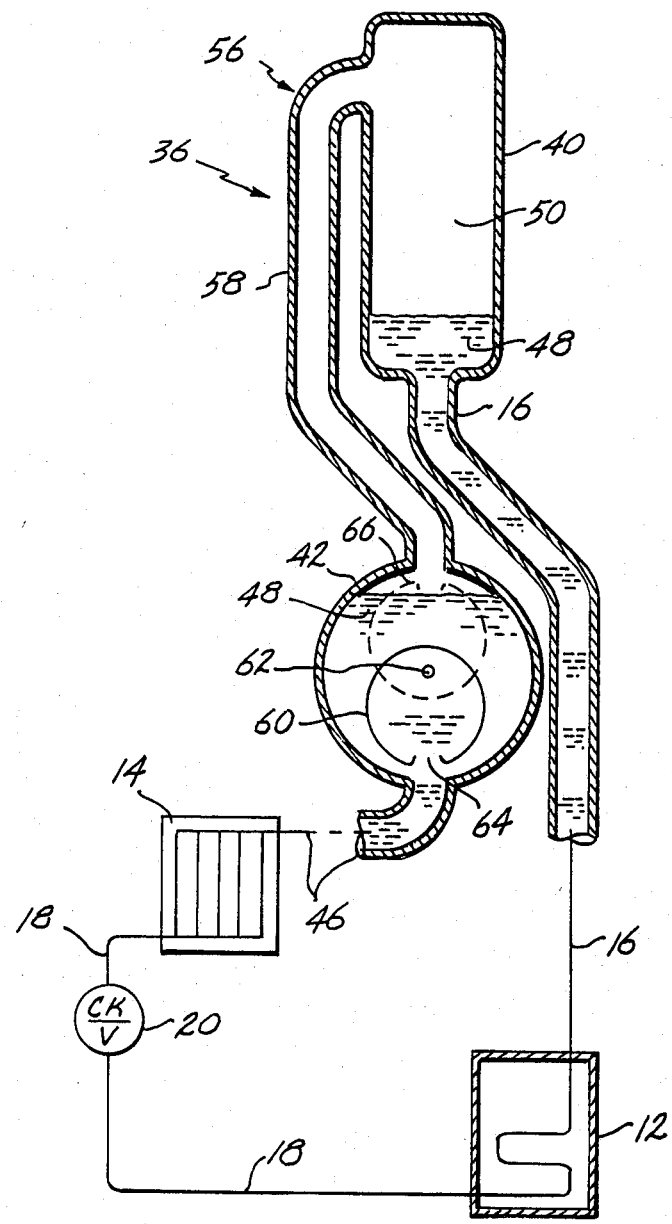

Referring now to FIG. 7, in an alternative embodiment a passive circulation unit 56 is provided with a valve that intermittently interrupts the flow of working vapor 50 from the heat collector outlet port 46. In this embodiment the upper and lower chambers 40, 42 are in fluid communication through a vent duct 58 that leads from the upper region of the lower chamber 42 to the upper region of the upper chamber 40. A valve, such as the flip valve 60 shown in this view, is disposed across the lower chamber 42 so as to cyclically regulate the flow of working vapor 50 through the lower chamber 42. The flip valve 60 has open and closed ends and is pivotally supported by an eccentrically disposed pin 62 that spans the lower chamber 42. During the initial phase of the working cycle the flip valve 60 hangs with its open end 64 disposed downwardly so as to capture the bubbles of working vapor 50 that emanate from the heat collector 14. The bubbles of working vapor 50 drift into the closed end of the flip valve 60 and displace working fluid 48 from the lower chamber 42 into the vent duct 58. When the flip valve 60 becomes filled with working vapor 50 to the point that buoyancy overcomes gravity, the flip valve 60 rotates to phantom position 66) and discharges the captured working vapor 50 into the vent duct 58. The discharged working vapor 50 pushes working fluid 48 through the vent duct 58 and into the upper chamber 40. The inflow of working fluid 48 into the upper chamber 40 develops a pressure head on the upstream side of the check valve 20, causing the check valve 20 to open and working fluid 48 to circulate through the system 36. The upturned flip valve 66 fills with working fluid 48 and rotates down to the initial position 60.

The passive heat transfer system 36 of the present invention is distinguished by its simplicity, durability, and the reduced costs of manufacturing and particularly installation that it affords. In its simplest embodiment, the passive circulation unit 38 of the present invention has no moving parts and thus is insensitive to shape and internal surface quality. It is likely to function even when partially corroded, as long as the walls withstand the working pressure.

This passive heat transfer system 36 is self-starting and requires no nonthermal energy input or external controls. The pumping rate of the passive circulation unit 38 (or 56) increases with the amount of heat that is introduced into the system 36 through a solar collector panel, fireplace heat collector, or other heat collector 14. Circulation rate and temperature control are simultaneously regulated because the circulation rate depends upon the boiling point of the working fluid 48. High and low boiling systems 36 can be readily achieved by selecting a working fluid 48 with a boiling point in the desired range.

While the present invention has been described in conjunction with preferred embodiments, one or ordinary skill after reading the foregoing specification will be able to effect various changes, substitutions of equivalents, and other alterations to the systems and devices set forth herin. For example, it is understood that this passive circulation unit can be used wherever heat needs to be transported from a heat source to a heat sink that is located below the heat source. The passive circulation unit must be charged with working fluid, but some or all of the remaining components of the heat transfer system need not be, in which case the working-fluid charged passive circulation unit can be coupled through one or more heat exchangers to one or more of the other components. It is therefore intended that the protection granted by Letters Patent hereon be limited only by the definition contained in the appended claims and equivalents thereof.

The embodiments of the invention in which an exclusive property or privilege is claimed are defined as follows:

1. An improved heat transfer system of the type including a heat collector, a heat sink, a collector drain duct, a collector feed duct, and a check valve, wherein the heat sink is positioned below the heat collector, the heat collector is in fluid communication through the collector drain duct with the heat sink, the heat sink is in direct fluid communication through the collector feed duct with the heat collector, and the check valve is positioned in the system to prevent back flow from the heat collector through the collector feed duct to the heat sink, the improvement in combination therewith comprising a passive circulation unit, the passive circulation unit being partially evacuated of air and consisting of an upper chamber, a lower chamber, and a vent duct, the upper and lower chambers being disposed in vertical array, the lower end of the lower chamber being disposed above and in fluid communication with the heat collector, the lower and upper chambers being in fluid communication through the vent duct, the vent duct leading from the lower region of the lower chamber to the upper region of the upper chamber, and the lower region of the upper chamber being in fluid communication through the collector drain duct with the heat sink, the passive circulation unit adapted to receive working fluid liquid and working fluid vapor from the heat collector and to deliver only working fluid liquid to the collector drain duct.

2. The improved heat transfer system of claim 1, wherein the heat collector is a solar heat collector.

3. The improved heat transfer system of claim 1, wherein the heat collector is a fireplace heat collector.

4. The improved heat transfer system of claim 1, wherein the passive circulation unit is thermally insulated from the surrounding environment.

5. A passive circulation unit for transferring a volatile working fluid from a heat collector to a heat sink positioned below the heat collector consisting of:

an upper chamber and a lower chamber, the upper and lower chambers being disposed in vertical array, the lower region of the lower chamber being configured and arranged for establishing and maintaining liquid and vapor communication between the lower chamber and the heat collector, the lower region of the upper chamber being configured and arranged for establishing and maintaining liquid communication between the upper chamber and the heat sink; and a vent duct leading from the lower region of the lower chamber to the upper region of the upper chamber.

6. The apparatus of claim 5, wherein the upper chamber, lower chamber, and vent duct are thermally insulated from the surrounding environment.

7. In a condenserless heat transfer system of the type including a heat collector having uniformly heated boiler surfaces, a heat sink, a collector drain duct, a collector feed duct, and a check valve, wherein the heat sink is positioned below the heat collector, the heat collector is in fluid communication through the collector drain duct with the heat sink, the heat sink is in fluid communication through the collector feed duct with the heat collector, and the check valve is positioned in the system to prevent back flow from the heat collector through the collector feed duct to the heat sink, the improvement in combination therewith comprising a passive circulation unit, the passive circulation unit consisting of an upper chamber, a lower chamber, and a vent duct, the upper and lower chambers being disposed in vertical array, the lower end of the lower chamber being disposed above and in fluid communication with the heat collector, the lower and upper chambers being in fluid communication through the vent duct, the vent duct leading from the lower region of the lower chamber to the upper region of the upper chamber, and the lower region of the upper chamber being in fluid communication through the collector drain duct with the heat sink, the passive circulation unit adapted to receive working fluid liquid and working fluid vapor from the heat collector and to deliver only working fluid liquid to the collector drain duct.

8. The improved condenserless heat transfer system of claim 7, wherein the heat collector having uniformly heated boiler surfaces is a solar heat collector.

9. The improved condenserlss heat transfer system of claim 7, wherein the heat collector having uniformly heated boiler surfaces is a fireplace heat collector.

10. The improved condenserless heat transfer system of claim 7, wherein the passive circulation unit is partially evacuated of air.

11. The improved condenserless heat transfer system of claim 7, wherein the passive circulation unit is thermally insulated from the surrounding environment.

* * * * *

UNITED STATES PATENT AND TRADEMARK OFFICE
CERTIFICATE OF CORRECTION

PATENT NO. : 4,611,654

DATED : September 16, 1986

INVENTOR(S) : Christian K.E. Buchsel

It is certified that error appears in the above-identified patent and that said Letters Patent is hereby corrected as shown below:

Column 3, line 8 "pont" should be --point--
    Column 4, line 12, "of" should be --or--
    Column 5, line 7, "is" should be --in--
    Column 6, line 20, insert --(-- (parenthesis) before "to"
                 line 54, "or" should be --of--
                 line 58, "herin" should be --herein--
    Column 8, line 40, "condenserlss" should be --condenserless--
                 (Claim 9, line 1)

Signed and Sealed this

Tenth Day of February, 1987

*Attest:*

DONALD J. QUIGG

*Attesting Officer*        *Commissioner of Patents and Trademarks*